3,234,284
LITHIUM ACETYLIDE AMINE COMPLEXES AND METHOD OF PRODUCING SAME
Oscar Francis Beumel, Jr., West Chester, and Robert Francis Harris, Linwood, Pa., assignors to Foote Mineral Company, Exton, Pa., a corporation of Pennsylvania
No Drawing. Filed Sept. 25, 1962, Ser. No. 226,178
16 Claims. (Cl. 260—583)

This invention relates to a novel method for producing lithium acetylide compounds. More particularly, this invention provides a novel method of producing stable lithium acetylide and lithium acetylide complexes from lithium carbide.

It is known that certain organolithium compounds such as monolithium acetylide can be prepared from lithium and acetylene in a liquid ammonia reaction media. Such a process is subject to a number of shortcomings, particularly if it is to be carried out on a commercial or semi-commercial scale. Moreover, the product of such a process, that is, the organometallic salt lithium acetylide (i.e. monolithium acetylide) is extremely unstable and must be maintained in liquid ammonia which, of course, requires low temperatures and the like. Because of its instability, monolithium acetylide is unwieldy and commercially unattractive to store and ship.

Therefore, it is an object of this invention to provide a novel, convenient method for the preparation of a lithium acetylide product.

A further object of this invention is to provide a process for producing a lithium acetylide product which is stable at room temperature and which can be shipped and stored without extensive precautions.

A primary object of the invention is to provide a novel process for making stable lithium acetylide complexes from lithium carbide.

A still further object of the invention is to provide a process for producing novel lithium acetylide·amine complexes.

These and other objects of the invention will become evident from a consideration of the following specification and claims.

It has been disclosed in copending application Serial Number 216,037, filed August 22, 1962, now abandoned, and in application Serial Number 226,142, filed September 25, 1962, as a continuation-in-part of said application Serial Number 216,037, that finely divided metal dispersions of alkali metals such as sodium and lithium, can be reacted directly with certain organo compounds to produce the corresponding organo alkali metal salt; provided the reaction is conducted in the presence of certain amine compounds. It has now been discovered that certain lithium acetylide complexes disclosed in the above referenced application can be produced directly from lithium carbide according to the following general reaction:

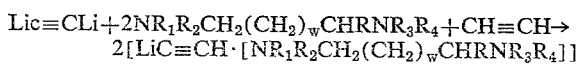
$$\text{Li}_2\text{C} \equiv \text{CLi} + 2\text{NR}_1\text{R}_2\text{CH}_2(\text{CH}_2)_w\text{CHRNR}_3\text{R}_4 + \text{CH} \equiv \text{CH} \rightarrow$$
$$2[\text{LiC} \equiv \text{CH} \cdot [\text{NR}_1\text{R}_2\text{CH}_2(\text{CH}_2)_w\text{CHRNR}_3\text{R}_4]]$$

wherein $R_1$, $R_2$, $R_3$ and $R_4$ can each be a hydrogen atom, alkyl or alkylamine groups each having from 1 to 10 carbon atoms, R can be a hydrogen atom or an organo radical having from 1 to 10 carbon atoms and $w$ is a whole number 0 to 1. The foregoing reaction shall hereafter be referred to as the general reaction.

In the present invention where lithium carbide is the source of lithium, rather than lithium metal, it is believed that the reaction proceeds directly, forming lithium acetylide complexes without the formation of intermediate compounds such as disclosed in the above referenced copending application. Comparing the relative thermodynamics of lithium carbide and monolithium acetylide, one would predict that monolithium acetylide would revert to the more stable lithium carbide; however, it has been found that such a reversion does not take place when the monolithium acetylide is in a complex compound, as herein defined.

It is unexpected that the herein described lithium acetylide compounds can be produced by the instant process without resorting to a reaction media of liquid ammonia and the like. For it has been found that lithium carbide dispersions in inert solvents do not react directly with acetylene at temperatures, for example ranging from about 0° C. up to about 50° C. under atmospheric pressure, whereas, unexpectedly, lithium carbide reacts with acetylene at temperatures ranging from say —50° up to about 45° C. in the presence of certain amine compounds to produce the corresponding lithium acetylide complex.

Many of the monolithium acetylide complexes produced in accordance with the invention are stable and may be stored in dry solvent-free crystalline form, others tend to be less stable when separated from solvents. Whether the crystalline complex form of the product is isolated will depend on various conditions of the reaction, the particular amine compound employed and the like. It has been found that certain of the above defined amines for example, ethylenediamine and diethylenetriamine tend to form highly stable crystalline complexes. However other amines such as N,N,N',N'-tetramethylethylenediamine, N,N-diethylethylenediamine and 1,3-diamino propane tend to produce monolithium acetylide complexes which are more stable in slurry form (see Examples IV–VI). It will be appreciated by those skilled in the art that for certain purposes it would be desirable to have the product in a stable crystalline form, whereas under other circumstances the lithium acetylide in a slurry form would be more desirable.

The instant process has numerous advantages. For example, it is flexible in that it can be adapted to single or multi-phase systems. Isolation of substantially pure lithium acetylide complexes is readily accomplished, thus requiring few manipulative procedures resulting in the production of these complexes in a high state of purity at relatively low cost.

There are numerous sources of lithium carbide which are suitable for the purposes of the invention, for example:

(a) Lithium and carbon can be fused at high temperatures to produce a satisfactory lithium carbide starting material;

(b) Lithium can be reacted with acetylene in the presence of catalytic amounts of various amine compounds to produce lithium carbide, this process is discussed in the above-referenced copending application.

Other methods of producing lithium carbide are also known and may be used to produce the starting material for the present invention. In general, the method employed will depend upon the particular source of the lithium available; for example, lithium hydride, if available, can be used to produce lithium carbide, according to conventional processes disclosed in the art.

The lithium carbide employed in the invention should preferably be in a fine state of subdivision since the reactivity of the material is a function of its particle size; that is, the reaction with acetylene is believed to occur essentially at the surface of the lithium carbide, and the finer the division of the carbide, the more surface will be available for the reaction. When lithium carbide is produced by a fusion of lithium metal and acetylene it will generally be in aggregate form, and in this form will require reduction to a fine particle size.

Generally the lithium carbide will be ground under inert conditions such as an atmosphere of argon or an inert solution such as hexane by conventional grinding means such as a ball mill or a mortar and pestle. In general, it is desirable that the lithium carbide particles be below 500 microns in diameter with the average particle diameter being not more than about 100 microns. The average particle size may advantageously be lower, for example of not more than 10 microns and preferably of the order of 3 microns or less.

In a preferred embodiment, the ground lithium carbide will be maintained in a reaction medium in the form of a suspension. However, it will be understood by one skilled in the art that the lithium carbide can be reacted according to the herein-described process when it is present in the reaction medium in a form other than a suspension, i.e. a similar reaction occurs with lithium carbide pellets, or with lithium carbide in aggregate form. In a preferred embodiment, the lithium carbide employed is in a fine powder form which is readily suspended in the reaction medium. A suitable liquid medium for such a lithium carbide suspension should be non-reactive towards the lithium carbide and, under the pressure conditions obtaining, should preferably have a boiling point above the reaction temperature of the process. High flash hydrocarbon solvents such as mineral oils, for example white oil, or refined diesel fuels are advantageously used because of the low fire hazard they present. However, any of a wide variety of inert organic solvents are useful, particularly those of the hydrocarbon class such as petroleum, pentane, cyclopentane, hexane, cyclohexane, heptane, mineral spirits and other petroleum hydrocarbons of various kinds, aromatics for example such as benzene, toluene, xylene and so forth and mixtures of these materials may be used.

It is further preferred that the liquid suspending medium used be free of impurities which are highly reactive with the lithium carbide or with reaction mixture components or products. Thus, materials such as water, alcohols and olefins should be absent. The only limiting feature with respect to the impurities which can be tolerated in the reactants is that they should not react with the end product, the presence of impurities which will react with the amine compound is undesirable but can be tolerated by the addition of more of the amine compound.

The amine compounds suitable for use in the instant process are defined above in connection with the general reaction and have the general formula

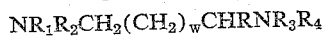

$$NR_1R_2CH_2(CH_2)_wCHRNR_3R_4$$

wherein $w$, $R_1$, $R_2$, $R_3$, $R_4$ and $R$ are as defined above. Primary, secondary and tertiary amines can be used. However, it has been found that amine compounds other than 1,2- or 1,3-substituted amines are ineffective in the instantly described process, that is, there must be two amino groups on adjacent carbon atoms or on carbon atoms separated from each other by not more than one carbon atom. Therefore when $w$ is zero, a 1,2-substituted amine is defined and when $w$ is one, a 1,3-substituted amine is defined. Examples of amine compounds effective in applicants' process are ethylenediamine, 1,2-diamino propane, 1,3-diamino propane, 1,3-diamino butane, 1,3-diamino hexane, 1,2-diamino decane, triethylenetetraamine, diethylenetriamine, N,N,N',N' - tetramethylethylenediamine and the like. In contrast to the various amines disclosed in the above-referenced copending application, the amine compounds suitable for the general reaction include those compounds where all the amine groups are tertiary, that is, where all the amino hydrogens are replaced by alkyl groups such as in N,N,N',N'-tetramethylethylenediamine, N,N,N',N-tetraethylethylenediamine and N,N-dimethyl N',N'-dihexylethylenediamine. From the foregoing compounds it will be evident that R in the above formula can be an alkyl radical, additionally R can also be an aryl, aralkyl, alkylaryl radical having up to 10 carbon atoms or an oxygenated radical such as an ether radical. It is understood that the amine compounds will be free from moisture, olefinic compounds or other materials which are reactive with the reactants or the product of the process.

The molar ratio of amine compound to lithium carbide may range from say 1.9:1 to say 50:1. In a preferred embodiment the ratio of the amine compound to lithium carbide is at least about 2:1.

The reaction is preferably carried out in the presence of an inert organic solvent. Aromatic hydrocarbon solvents in which the amines are readily soluble such as benzene are particularly preferred, for in such a system a single liquid phase reaction media results. Although aliphatic solvents such as hexane, wherein the amine compound is not readily soluble, can be used; the rate of reaction is somewhat reduced. It should be noted however, that the solubility of amines in certain solvents such as hexane increases with an increase in temperature. The various solvents discussed above, suitable for use as suspending media for the lithium carbide, can also be used as a reaction media for the general reaction. The amine reactants themselves can be employed as solvents and this embodiment is particularly attractive, for the amine functions as a reactant, solvent, and complexing agent.

It is further essential that the solvents be free from extraneous reactive materials such as water, olefinic compounds and the like, and in a preferred embodiment of the invention the solvents are employed in a high state of purity. Under certain conditions it may be preferable to employ a mixture or combination of two or more of the solvents listed above to obtain improved stability, solubility and catalytic properties. Usually the general reaction is conducted at a temperature below the cleavage temperature of various oxygenated solvents and therefore a wide range of such oxygenated solvents may be also employed.

The lithium carbide in a powder form, or as a suspension, amine reactant and acetylene compound can be introduced into a reaction vessel simultaneously or in various sequences. For example, the amine may be added to the lithium carbide first, with the acetylene subsequently added to the resultant mixture, or the lithium carbide can be added to a reaction vessel containing the amine or a mixture of the amine and an inert solvent with the acetylene being subsequently added, or the lithium carbide and acetylene can be added simultaneously to the amine. It is generally desirable to have an excess of acetylene present to insure complete reaction of all the lithium carbide present. It may also be desirable to introduce additional solvent or diluent into the reaction mixture. As discussed previously, the liquid reaction medium for the present invention may be an inert liquid such as those mentioned above in reference to the preparation of the lithium carbide suspension or alternatively, it can consist primarily of an amine reactant or a mixture of solvent and an amine reactant. It is noted that the reaction mixture need not be in the same solvent in which the lithium carbide is suspended, although it may be. The amounts of acetylene to be used to produce substantially pure organolithium acetylide·complex products will be at least one mode of acetylene per mole of lithium carbide. It is preferred that the ratio of acetylene to lithium carbide be from about 1.5:1 to about 8:1.

The general reaction will usually be conducted at temperatures ranging from about the freezing temperature of the solvent say 0° C. up to about 45° C. Ordinarily, the reaction will be conducted at atmospheric pressure but sub or superatmospheric pressures say from 1 mm. Hg to 20 atmospheres absolute may be used if desired. It is desirable to exclude air from the reaction mixture since the components of said mixture are sensitive to air and thus the reaction would usually be conducted under an atmosphere of inert gas such as nitrogen or argon. In a preferred procedure for carrying out the reaction the amine is added to a suspension of lithium carbide in a solvent. Subsequently, acetylene is introduced into the reaction mixture to form the desired product. To insure complete reaction between acetylene and the lithium carbide the former is maintained in the reaction mixture over an extended period of time, such as from ten minutes to ten hours or longer if desired. Batch procedures may often be most useful when handling the reaction mixture; however, the process may also be conducted continuously.

To insure a satisfactory rate of reaction the reaction mixture is subjected to conventional agitation as by stirring. In a single phase liquid system, contact between the amine and the lithium carbide is readily accomplished, whereas in a two-phase liquid system either longer reaction time or more vigorous contacting means must be employed to insure a satisfactory rate of contact between the reactants.

After the reaction is complete, the product may be isolated, where appropriate, following known techniques. Conventional purification procedures can be employed, such as recrystallization from a suitable solvent.

The various lithium acetylide complexes including the novel complexes wherein the amino nitrogens are completely substituted with alkyl groups such as lithium acetylide·N,N,N',N'-tetramethylethylenediamine can be used in various pharmaceutical processes such as in the production of vitamin A. In addition, these complexes have other chemical and pharmaceutical uses, for the acetylide thereof reacts actively with both hindered and non-hindered ketones such as acetone and benzophenone and is also an excellent coupling reagent with organo chlorides and bromides.

The process of the present invention will be more readily understood from a consideration of the following specific examples which are given for the purpose of illustration only and are not intended to limit the scope of the invention in any way.

It will be understood that the reactants described in the following examples are carried out in an inert atmosphere in the absence of moisture or any other foreign materials which are reactive with the reactants. Closed reaction vessels are used and the free spaces thereof contain only the vapors of the reactants, products of the reaction, the solvent and the insert gases discussed above.

Examples I–III illustrate the preparation of monolithium acetylide·amine complexes in various oxygenated solvents according to the general reaction.

The lithium carbide used in all the examples was produced by reacting equivalent amounts of acetylene with a lithium metal dispersion in the presence of catalytic amounts of ethylene diamine. The reaction temperature is maintained at 25° C. in all the examples.

*Example I*

A suspension of lithium carbide (0.6 mole) in 200 ml. of 1,4-dioxane is combined with ethylenediamine (1.20 moles) in a reaction flask. 2.0 moles of acetylene are introduced into the reaction mixture over a period of 2 hours. A 91% yield of crystalline monolithium acetylide·ethylenediamine (complex) is obtained.

*Example II*

A suspension of lithium carbide (0.22 mole) in 150 ml. of diethyl ether is combined with ethylenediamine (0.44 mole) in a reaction flask. 1.0 mole of acetylene is introduced into the reaction mixture over a period of 1 hour. An 86% yield of crystalline monolithium acetylide·ethylenediamine is obtained.

*Example III*

A suspension of lithium carbide (0.23 mole) in 150 ml. of 1,4-dioxane is combined with diethylenetriamine (0.46 mole) in a reaction flask. 1.0 mole of acetylene is introduced into the reaction mixture over a period of 2 hours. An 80% yield of crystalline monolithium acetylide·diethylenetriamine is obtained.

Examples IV to VI illustrate the preparation of monolithium acetylide complexes which are more stable in the form of slurries. Example IV illustrates the preparation of monolithium acetylide complexes wherein both nitrogen atoms of the diamine compound used are tertiary.

*Example IV*

A suspension of lithium carbide (0.23 mole) in 150 ml. of 1,4-dioxane is combined with N,N,N',N'-tetramethylethylenediamine (0.46 mole) in a reaction flask. 1.0 mole of acetylene is introduced into the reaction mixture over a period of 2 hours. The resultant slurry was found to contain a 45% yield of monolithium acetylide·N,N,N',N'-tetramethylethylenediamine complex.

The following example illustrates the preparation of a monolithium acetylide complex in a hydrocarbon solvent wherein the amine compound employed is 1–3 substituted, that is, $w$ is 1 in the general formula.

*Example V*

A suspension of lithium carbide (0.21 mole) in 150 ml. of benzene is combined with 0.42 mole of 1,3-diamino propane in a reaction flask. 1.0 mole of acetylene is introduced over a period of 1 hour. A slurry containing a 50% yield of monolithium acetylide·1,3-diamino propane complex is obtained. It is understood that amine compounds such as 1,3-diamino butane, 1,3-diamino hexane and 1,2-diamino decane can be substituted for 1,3-diamino propane in the above reaction with comparable results.

In the following example an amine compound having a tertiary and a primary amino group is used as the catalyst.

*Example VI*

A suspension of lithium carbide (0.31 mole) in 150 ml. of 1,4-dioxane is combined with 0.62 mole of N,N-diethylethylenediamine in a reaction flask. 1.0 mole of acetylene is introduced over a period of 1 hour. A slurry containing 33% yield of monolithium acetylide·N,N-diethylethylenediamine complex is obtained.

While the invention has been described with reference to various particular preferred embodiments thereof, it will be appreciated that modification and variation can be made without departing from the invention.

What is claimed is:

1. A lithium acetylide·amine complex having the structural formula LiC≡CH·[NR$_1$R$_2$CH$_2$(CH$_2$)$_w$CHRNR$_3$R$_4$] wherein R$_1$, R$_2$, R$_3$ and R$_4$ are each alkyl and alkylamine radicals each having from 1 to 10 carbon atoms and R is selected from the group consisting of hydrogen and alkyl radicals having from 1 to 10 carbon atoms and $w$ is a whole number from 0 to 1.

2. Lithium acetylide·N,N,N',N'-tetramethylethylenediamine.

3. The process of producing lithium acetylide·amine complexes from lithium carbide comprising reacting, in a substantially inert organic solvent, lithium carbide with acetylene in the presence of an amine compound having the formula NR$_1$R$_2$(CH$_2$CH$_2$)$_w$CHRNR$_3$R$_4$ wherein R$_1$, R$_2$, R$_3$ and R$_4$ are each selected from the group consisting of hydrogen, alkyl and alkylamine radicals each having from 1 to 10 carbon atoms, and R is selected from the group consisting of hydrogen and alkyl radicals having from 1 to 10 carbon atoms, and $w$ is a whole number from 0 to 1, in the reaction mixture, the mole ratio of amine compound to lithium carbide being at least 1.9:1 and the mole ratio of acetylene to lithium carbide being at least 1:1.

4. A process as claimed in claim 1, wherein R$_1$, R$_2$, R$_3$, R$_4$ and R are each hydrogen atoms.

5. The process of claim 1 wherein the mole ratio of amine compound to lithium carbide is from about 2:1 to about 50:1, and wherein the mole ratio of acetylene to lithium carbide is from about 1.5:1 to about 8:1.

6. A process as claimed in claim 4, wherein $w$ is zero.

7. The process of claim 4 wherein the mole ratio of amine compound to lithium carbide is from about 2:1 to about 50:1, and wherein the mole ratio of acetylene to lithium carbide is from about 1.5:1 to about 8:1.

8. The process of producing lithium acetylide·amine complexes comprising reacting, in a substantially inert organic solvent, lithium carbide and acetylene in the presence of an amine compound having the formula $NR_1R_2CH_2(CH_2)_wCHRNR_3R_4$ wherein $R_1$, $R_2$, $R_3$ and $R_4$ are each selected from the group consisting of hydrogen, alkyl and alkylamine radicals each having from 1 to 10 carbon atoms, R is selected from the group consisting of hydrogen and alkyl radicals having from 1 to 10 carbon atoms, and $w$ is a whole number from 0 to 1, said complex having the formula

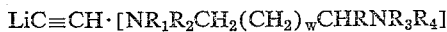

wherein $R_1$, $R_2$, $R_3$, $R_4$ and $w$ are as defined above; in the reaction mixture, the mole ratio of amine compound to lithium carbide being at least 1.9:1 and the mole ratio of acetylene to lithium carbide being at least 1:1.

9. The process of claim 8 wherein $w$ is zero.

10. A process as claimed in claim 8, wherein the organic solvent is selected from the group consisting of hydrocarbon solvents, ether solvents and excess of said amine compound.

11. The process of producing lithium acetylide from lithium carbide comprising, in a substantially inert organic solvent, the following general reaction:

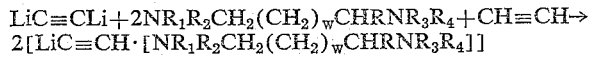

wherein $R_1$, $R_2$, $R_3$ and $R_4$ are each selected from the group consisting of hydrogen, alkyl and alkylamine radicals each having from 1 to 10 carbon atoms, R is selected from the group consisting of hydrogen and alkyl radicals having from 1 to 10 carbon atoms and $w$ is a whole number from 0 to 1.

12. The process of reacting, in a substantially inert organic solvent selected from the group consisting of hydrocarbon solvents and ether solvents, lithium carbide with acetylene in the presence of ethylenediamine to produce lithium acetylide·ethylenediamine; in the reaction mixture, the mole ratio of ethylenediamine to lithium carbide being at least 2:1 and the mole ratio of acetylene to lithium carbide being from about 1.5:1 to about 8:1.

13. The process of reacting, in a substantially inert organic solvent selected from the group consisting of hydrocarbon solvents and ether solvents, lithium carbide with acetylene in the presence of diethylenetriamine to produce lithium acetylide·diethylenetriamine; in the reaction mixture, the mole ratio of diethylenetriamine to lithium carbide being at least 2:1 and the mole ratio of acetylene to lithium carbide being from 1.5:1 to about 8:1.

14. The process of reacting, in a substantially inert organic solvent selected from the group consisting of hydrocarbon solvents and ether solvents, lithium carbide with acetylene in the presence of N,N,N',N'-tetramethylethylenediamine to produce lithium acetylide·N,N,N',N'-tetramethylethylenediamine; in the reaction mixture, the mole ratio of N,N,N',N'-tetramethylenediamine to lithium carbide being at least 2:1 and the mole ratio of acetylene to lithium carbide being from about 1.5:1 to about 8:1.

15. The process of reacting, in a substantially inert organic solvent selected from the group consisting of hydrocarbon solvents and ether solvents, lithium carbide with acetylene in the presence of 1,3-diaminopropane to produce lithium acetylide·1,3-diaminopropane; in the reaction mixture, the mole ratio of 1,3-diaminopropane to lithium carbide being at least 2:1 and the mole ratio of acetylene to lithium carbide being from about 1.5:1 to about 8:1.

16. The process of reacting, in a substantially inert organic solvent selected from the group consisting of hydrocarbon solvents and ether solvents, lithium carbide with acetylene in the presence of N,N-diethylethylenediamine to produce lithium acetylide·N,N-diethylethylenediamine; in the reaction mixture, the mole ratio of N,N-diethylethylenediamine to lithium carbide being at least 2:1 and the mole ratio of acetylene to lithium carbide being from 1.5:1 to about 8:1.

No references cited.

CHARLES B. PARKER, *Primary Examiner.*